A. F. RIETZEL.
UNITING THE COMPONENT PARTS OF COMPOSITE SHEET METAL STRUCTURES.
APPLICATION FILED FEB. 24, 1905.
928,701.
Patented July 20, 1909.
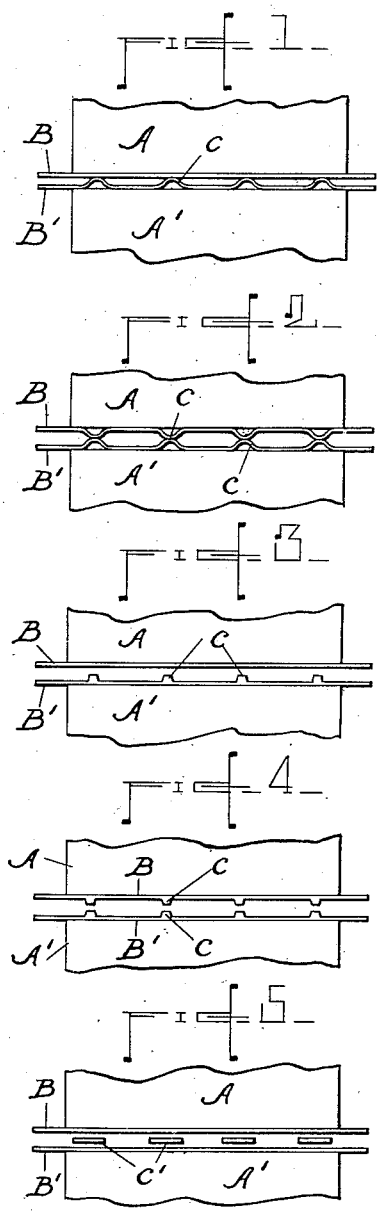
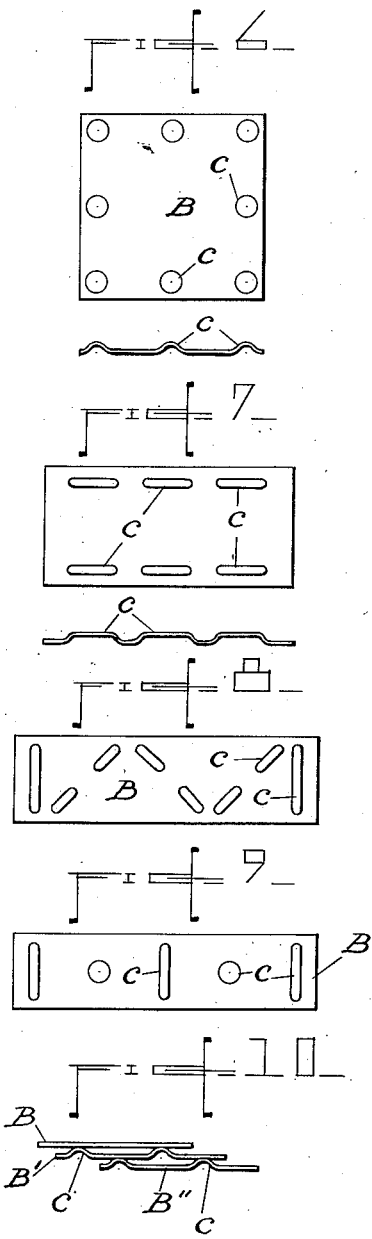
WITNESSES:
INVENTOR
Adolph F. Rietzel.
BY
ATTORNEYS

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

UNITING THE COMPONENT PARTS OF COMPOSITE SHEET-METAL STRUCTURES.

No. 928,701. Specification of Letters Patent. Patented July 20, 1909.

Application filed February 24, 1905. Serial No. 247,081.

*To all whom it may concern:*

Be it known that I, ADOLPH F. RIETZEL, a citizen of the United States, and a resident of Lynn, in the county of Essex and State of Massachusetts, (with post-office address Lynn, Massachusetts,) have invented certain new and useful Improvements in Uniting the Component Parts of Composite Sheet-Metal Structures, of which the following is a specification.

My invention relates to the manner of uniting or fastening two pieces of metal to one another and its object is more particularly to afford a substitute for the manner of uniting pieces of metal as heretofore practiced in the art of electric welding.

As applied to sheet metal manufactures the object is to afford a cheap and practical substitute for riveting and other methods of mechanically securing the two pieces of metal together. As applied to this branch of the metal working arts, the invention affords a means whereby articles of composite sheet metal manufacture may be made up by fastening the pieces of metal constituting the structure with a perfectly secure union and by a process that can be economically conducted.

Briefly stated, the invention consists in electrically welding pieces together in spots definitely located in and involving a portion only of their meeting surfaces, by the application of pressure and heating current localized in such spot or spots.

By the terms "weld" and "electric weld", as herein employed, I refer to that process of welding in which the metal is brought to plastic condition by passing an electric current from one to the other of two pieces where they are in contact and is welded while in such condition by the application of pressure, as contra-distinguished from a process of uniting metals, which is described in a patent to Bernardos, No. 363,320, dated May 17, 1887, and in which the union is effected by melting the metal by an arc and which is different from "welding" in the ordinary sense of the term as applied to metal manufactures, in that the metal is heated beyond the point of plasticity and pressure is not employed.

It has been before proposed to electrically weld two rods of metal together by a butt-welding process, the area of union effected being substantially coextensive with the cross-section of the pieces at their meeting ends, that is to say, the weld has been made over substantially the whole area of the opposed portions of said pieces. It has also been proposed to make a lap joint between the ends of two strips of metal by electrically uniting them together over substantially the whole area of the lapping surfaces. A weld formed according to my invention is distinguished however from such prior welds by the fact that the opposed surfaces are welded together in spots only, the heating electric current being localized or confined in any desired way to such spots so that the major portion of the opposed surfaces will not be involved in the welding, although they may, after the completion of the operation, lie in contact with one another or very close together.

My invention is particularly valuable in fastening of pieces of sheet metal together because not only does it limit the amount of electric energy required very considerably as compared with the prior methods of union, but it also diminishes the liability to burning of the metal which is liable to occur when the attempt is made to form a union of two sheets of metal by an electric welding process over substantially the whole area of the meeting or opposed surfaces.

In carrying out my invention any desired number of spots of union may be employed, such number depending obviously upon the extent of the meeting surfaces which are to be fastened together and also upon the strength of the union desired.

In carrying out my invention the localization of the flow of heating electric current and of welding pressure to the desired spot or spots may be brought about in any desired way. One of the preferred ways is by providing between the meeting surfaces or portions of the pieces to be united suitable conducting projections or points at the spots of union, which projections or points carrying the heating electric current from one piece to the other are so located in the meeting surfaces and are so separated from one another that on the application of the welding pressure the welded union resulting will be localized in the area of the opposed surfaces and will be substantially coextensive in area with the restricted area of the path of the effective heating current. Various ways of providing such points or projections will occur to those skilled in the art.

The preferred method is to indent the metal from the side reverse to that on which the union is effected by a suitable tool, the projections thus formed affording points for the passage of the electric current. This method is preferable also because it permits the welding to be produced at a multiplicity of spots simultaneously through the application of pressure over the whole rear surface of the plate, the points or projections in that case serving not only to localize the flow of the heating current but also to localize the welding pressure.

In the preferred manner of carrying out my invention in the case of sheet metal manufacture I provide projections from the meeting surfaces of both pieces that are to be united. Said projections may also be provided by interposing between the two plane sheets small pieces of conducting material which act in the same manner when the sheets are brought together, as projections which localize the heating current and the pressure. It will be understood, however, that in the latter instance as in the former, these pieces are so small and are placed such a distance apart that on the application of welding pressure there will be no running of the welds into one another but that the final union will be in spots only leaving well-defined areas on the meeting surfaces, in which the surfaces either lie in contact or separated from one another by a very thin space.

From the foregoing it will be seen that my invention is distinguished from prior methods of welding pieces of metal together in that it may be very cheaply practiced, because no attempt is made to weld over the whole of the opposed surfaces of the welded pieces; but on the contrary the union is at a spot or spots only which in ordinary cases will afford as strong a union as would be produced by the riveting of the pieces.

The invention further has the advantage that not nearly so much electric energy is required as is necessary when the electrically welded union extends over the whole area of the opposed surfaces. Moreover, the danger of burning when the attempt is made to weld two sheets of metal together by a lap weld is largely eliminated.

In the accompanying drawings Figures 1, 2, 3, 4 and 5 illustrate some of the ways in which the pieces of metal to be united may be prepared for the welding according to my invention. Figs. 6, 7, 8, and 9 show modifications in the form and disposition of the contact projections which result in the spots of electrically welded union. Fig. 10 shows the assembling of three plates together for welding according to my invention.

In the various figures of the drawing the invention is illustrated as carried out with two sheets of metal B, B'. In Fig. 1, plate B'. only is provided with the distinct or isolated spots (c) or projections for the flow of the electric current, to the plate B. which spots or points may be formed by indenting the plate with a suitable tool. The spots are located so far from one another that on the application of pressure coincidently with the flow of electric current from one plate to the other there will be a number of distinct areas or spots of electrically welded union of the plates separated by well-defined areas on the meeting surfaces in which no union takes place. The resultant is however a fastening of the plates together securely and which is practically as effective as if the attempt were made to form a welded union over the entire areas of the meeting surfaces. Obviously, the greater the distance between the spots the lesser the number that would be used and hence the lesser the consumption of energy in effecting the weld. This is of considerable importance where the meeting areas are large or where a considerable amount of work has to be done. The welding pressure is conveniently applied by conducting-blocks or electrodes, A, A', between which the two pieces B, B', are assembled. These electrodes, A, A', furnish the heating current while applying the pressure, the localization of the pressure in the spots being brought about in this instance by the pointing of the surfaces at point c.

In Fig. 2 both plates are provided with projections the points of which engage with one another, the pointing being produced by indenting the metal sheets from the rear.

Fig. 3 illustrates the localization of the welding by casting projections upon one of the sheets and Fig. 4 by casting projections on both pieces. The localization of the welding in spots might be effected as illustrated in Fig. 5 by interposing small pieces of metal at the spot or spots of desired union, these pieces operating when the plates are brought together in the same way as the projections before referred to. The number and size of the pieces and their distance apart is in this case, as before, so chosen that the application of pressure together with the flow of heating current from one plate to the other will result in a union of the two pieces over their opposed surfaces in spots only thereon.

Fig. 6 shows how the spots might be disposed to fasten the pieces together in distinct spots around their edges.

As shown in Figs. 7 and 8 the projections, instead of being round, might be somewhat elongated and irregularly or symmetrically arranged.

Fig. 9 shows round and somewhat elongated projections combined.

In all these instances however, the union over the surfaces of the plates is confined to spots or areas which are of comparatively small extent as compared with the total area of the meeting surfaces. As will be obvious, the form and disposition of the points or projections of initial contact for flow of the electric current and localization of the pressure may be greatly varied without departing from my invention.

Fig. 10 illustrates the welding of three plates of sheets together when superposed.

My invention is especially useful in the manufacture of articles from sheet metal which are stamped out to different forms, and which have heretofore had their component portions united by riveting or other purely mechanical expedient which is not only expensive but requires generally special tools and results in many cases in an insecure union. When the invention is employed in its preferred form or manner of practice in the field of sheet metal manufacture all that is necessary is to provide the contact spots or projections as already described and then to assemble the pieces in an electric welding machine and weld them together as already set forth.

The product of the foregoing process is readily distinguishable from that produced by melting down the metal of the pieces from the back at spots as proposed in the before mentioned patent of Bernardos in that there is no substantial alteration of condition of the metal back of the welds appearing as a burning, roughening or disintegration of the material by the very great heat of the electric arc employed for melting down the metal, and by the further fact that the unions themselves in the material of the juxtaposed or opposite faces have the characteristics of a true weld produced by bringing the metal to welding temperature only and applying pressure, so that the pieces are solidly and firmly united and cannot be readily torn apart as they could be if the metal at the spots has been melted down under the high temperature of the electric arc.

The product in the form of sheet metal is further particularly useful for sheet metal ware since the outer or exposed surface of the metal will have the smooth and practically unaltered finish of sheet metal and said surface will not be substantially marred when the process is properly conducted, excepting for the presence of such infrequent small depressions as might remain from the previous indentation of the metal from the back when, as hereinbefore described, an indenting of the metal may be resorted to.

The product in sheet metal also possesses the advantage that the spots of welding when located within the edges of the meeting surfaces will not show. The product is also superior to that produced by riveting of the plates in that there are no rivet heads to mar the finish of the back or outer surfaces of the metal.

What I claim as my invention is:

1. The hereinbefore described improved method of fastening two pieces of metal together by electrically welding them to one another at spots only of their juxtaposed or opposite faces by the application of pressure and heating current localized in such spots.

2. The herein described method of uniting two pieces of metal at a number of distinct or separate spots separated from one another by well-defined areas of no union, consisting in applying pressure localized at the spots of desired union, and passing electric current through the pieces from one to the other while confining the flow of current to said spots until the union is effected.

3. The herein described method of uniting two pieces of metal, consisting in pressing them together while passing a heating electric current from one to the other and localizing the flow of current and the heating throughout the operation in a spot or spots of circumscribed or limited area as compared with the area of the immediately opposed surfaces so as to limit the union of the pieces to a spot or spots.

4. The improved method of uniting two pieces of metal at a spot or spots only in their opposed meeting surfaces, consisting in pressing the two pieces together, and passing a welding electric current from one to the other while localizing the pressure in and confining the flow of current to the spot or spots of desired union so as to produce an isolated spot or spots of union, leaving distinct or well-defined areas in which the pieces are not welded together.

5. The method of uniting two sheet metal pieces together face to face, consisting in pressing them together, and, simultaneously with the pressure, passing an electric current from one to the other at isolated or distinct spots in the areas lapping or opposed, said spots being separated from one another by such a distance that there is a union of the sheets at spots entirely surrounded by areas of no union.

6. The method of uniting sheets of metal by pressing them together and at the same time passing a heating and welding current from one to the other at a spot on their meeting surfaces which is restricted in area throughout the operation so as to leave on the meeting surfaces a well-defined and comparatively extensive area of no union completely surrounding said spot.

7. The method of welding two pieces of metal together, consisting in superposing said pieces with their surfaces at which the union is to take place superposed or presented to one another, pressing the pieces together, and passing a heating electric current from one to the other while localizing the heating current simultaneously in a number of distinct or separate spots of limited area, separated from one another sufficiently to secure a union of the pieces in a number of corresponding distinct spots surrounded by and separated from one another by distinct areas in which no union exists.

8. The method of uniting two pieces of metal, consisting in providing between their meeting surfaces a number of projections, spaced apart as described, pressing the pieces together and passing an electric current through said projections while confining the welding area of such current to said projections so as to leave distinct areas around spots in which no welding shall be produced.

9. The method of fastening two plates of metal together at a multiplicity of distinct or separate points of welded union, consisting in providing between them a number of isolated contact spots adapted to pass an electric current from one to the other but so separated that the electric welds will be separated from one another by unwelded areas, passing a heating electric current through such spots simultaneously and applying pressure as and for the purpose described.

10. The herein described method of electrically welding two plates or sheets of metal of any gage together by distinct spots of union disposed over their plane surfaces, consisting in providing a multiplicity of electrical contact spots coincident with the separated spots of union and disposed at such distances apart that there will be well-defined areas between spots through which the electric current will not flow, passing electric current from one plate to the other through said contact spots simultaneously and applying pressure as and for the purpose described.

11. The method of fastening two sheets of metal together, consisting in providing between them a number of isolated contact spots for the passage of the electric welding current, said spots being adapted to initially hold the plates apart and being separated from one another a sufficient distance to confine the welding to distinct areas or isolated spots, passing a heating electric current through a number of said contact spots simultaneously and pressing the plates together as and for the purpose described.

12. The method of fastening two plates of metal together, consisting in furnishing a surface of said plates with a number of projecting contact spots for the passage of welding electric current and disposed at such distances apart that on the application of pressure the welds will not run into one another, superposing said plates, passing a heating electric current from one to the other over said separated spots and applying the pressure to produce a spot-welding of the plates to one another as and for the purpose described.

13. The herein described method of fastening two pieces of metal together by providing each plate with a number of projecting contact spots on its plane surface disposed at such distances apart that the unions will not run into one another but will, nevertheless, firmly hold the plates together, superposing said plates with the projecting spots in simultaneous engagement with one another, passing a heating electric current from one plate to the other through the spots and simultaneously applying pressure thus uniting the plates at a number of distinct points of welded union.

14. The method of uniting two sheets of metal face to face, consisting in indenting the material, superposing the plates with the points of the indentations engaged, passing an electric current from one plate to the other through said points simultaneously, and applying pressure while confining the area of heating to welding temperature to a circumscribed area or spot entirely surrounded by areas unheated to welding temperature to unite the pieces in a distinct spot or spots of small extent in the whole area of the opposed faces.

15. The herein described method of fastening two plates together at a multiplicity of distinct mechanically separated points of welded union, consisting in indenting each plate to form a number of projecting contact spots on the plane surfaces which are to abut, superposing said plates with the projecting spots in simultaneous engagement with one another, passing a heating electric current from one plate to the other thereby forming a number of distinct zones or points of heated metal, heated to welding temperature, and applying pressure to complete the union of plates by a number of mechanically distinct unions.

16. Metal plates fastened together by a number of distinct or isolated welds on their meeting surfaces and in spots comprising meeting portions of the metal plates, the backs of said plates being practically unaltered in their metallic condition and the spots on the meeting surfaces being separated from one another by distinct unwelded areas.

17. Sheet metal work comprising pieces of sheet metal welded together in the material of their meeting surfaces and in spots only, each surrounded by distinct areas of unwelded union, the back surfaces of said pieces being substantially unaltered over the welded spots, substantially as and for the purpose described.

18. Composite metal work having its component pieces welded together in spots only involving the material of their opposed or meeting surfaces, said spots being each entirely surrounded by distinct areas of unwelded union and the portion of the pieces back of the welds being substantially unaltered, as and for the purpose described.

19. Metal work comprising a metal plate fastened on its surface to the opposed surface of another piece of metal by a weld at a spot only in the material of the opposed surfaces, said spot being surrounded by a distinct area of unwelded union and the back surface of said plate being practically unaltered over said spot, as and for the purpose described.

20. A metal article comprising two bodies of metal having adjacent plane surfaces united at a plurality of spaced and isolated spots of integral and autogenous welded union, the metal at the spots of welded union having substantially the same qualities as at other points.

Signed at Lynn in the county of Essex and State of Mass. this 7th day of Feb. A. D. 1905.

ADOLPH F. RIETZEL.

Witnesses:
EDWIN W. HAWES,
E. I. FOSTER.